July 22, 1958  G. H. COLLIER  2,844,219
WHEEL AND BRAKE
Filed Sept. 8, 1955  2 Sheets-Sheet 1

INVENTOR.
GEORGE H. COLLIER
BY
*R. L. Miller*
ATTORNEY

INVENTOR.
GEORGE H. COLLIER

United States Patent Office 2,844,219
Patented July 22, 1958

2,844,219

WHEEL AND BRAKE

George H. Collier, Akron, Ohio, assignor to The Goodyear Tire & Rubber Company, Akron, Ohio, a corporation of Ohio Application September 8, 1955, Serial No. 533,067

1 Claim. (Cl. 188—18)

This invention relates to wheel and brake combinations and more particularly, is concerned with a brake contained entirely within the wheel confines for absorbing large amounts of kinetic energy and a wheel extending entirely over the brake and supported at one side thereof by an axle and at the other side thereof by a bearing of such size as to permit being passed over the brake assembly and seated on a supporting brake flange, the wheel having a removable flange at one side of its rim portion.

It is the general object of the invention to provide a new and useful wheel having a rim base spanning the tire and a removable flange thereon, and a brake entirely enclosed by the rim base and capable of absorbing large amounts of kinetic energy.

Still another object is to provide a wheel and brake unit of high capacity occupying a minimum of space.

Another object of the invention is to provide such a wheel and brake combination in which the wheel is supported upon axially spaced bearings one of which is large enough to pass over the brake mechanism.

These and other objects will appear from the following description and the accompanying drawings.

Figure 1:
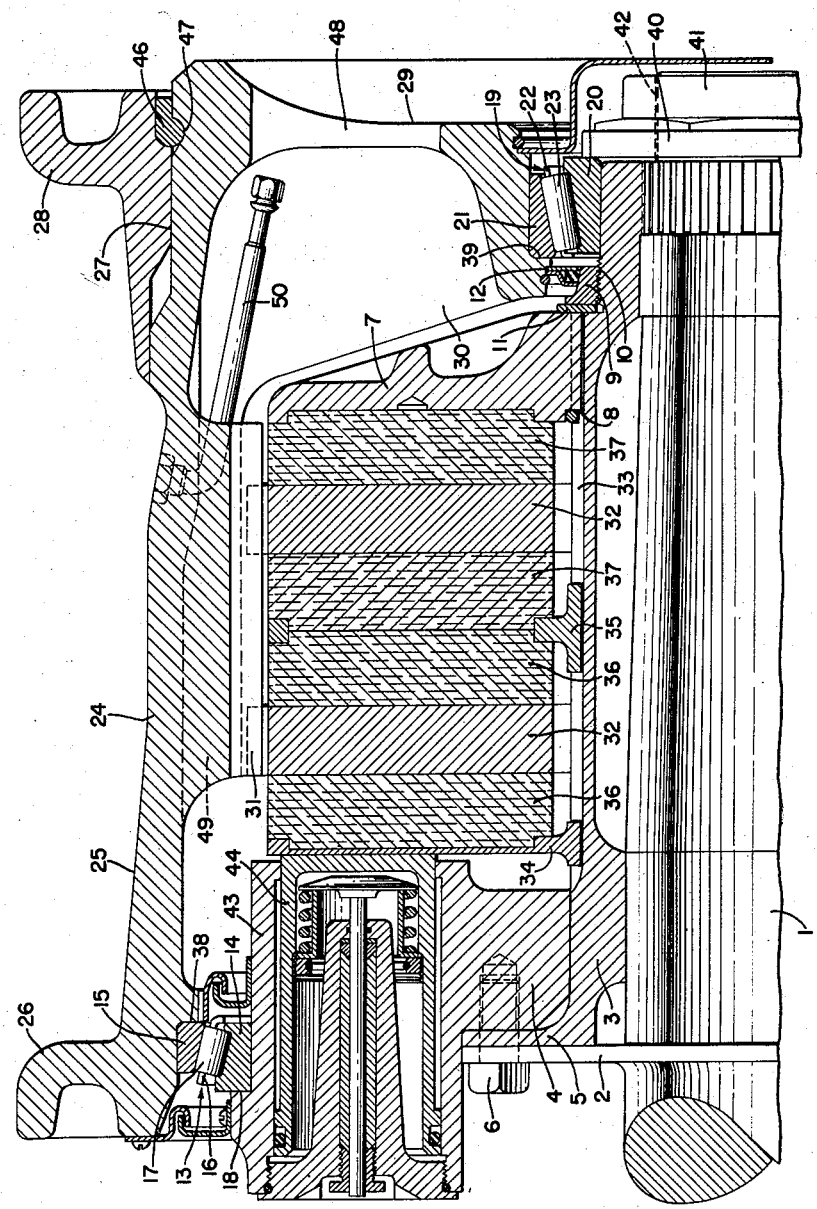
Figure 2:
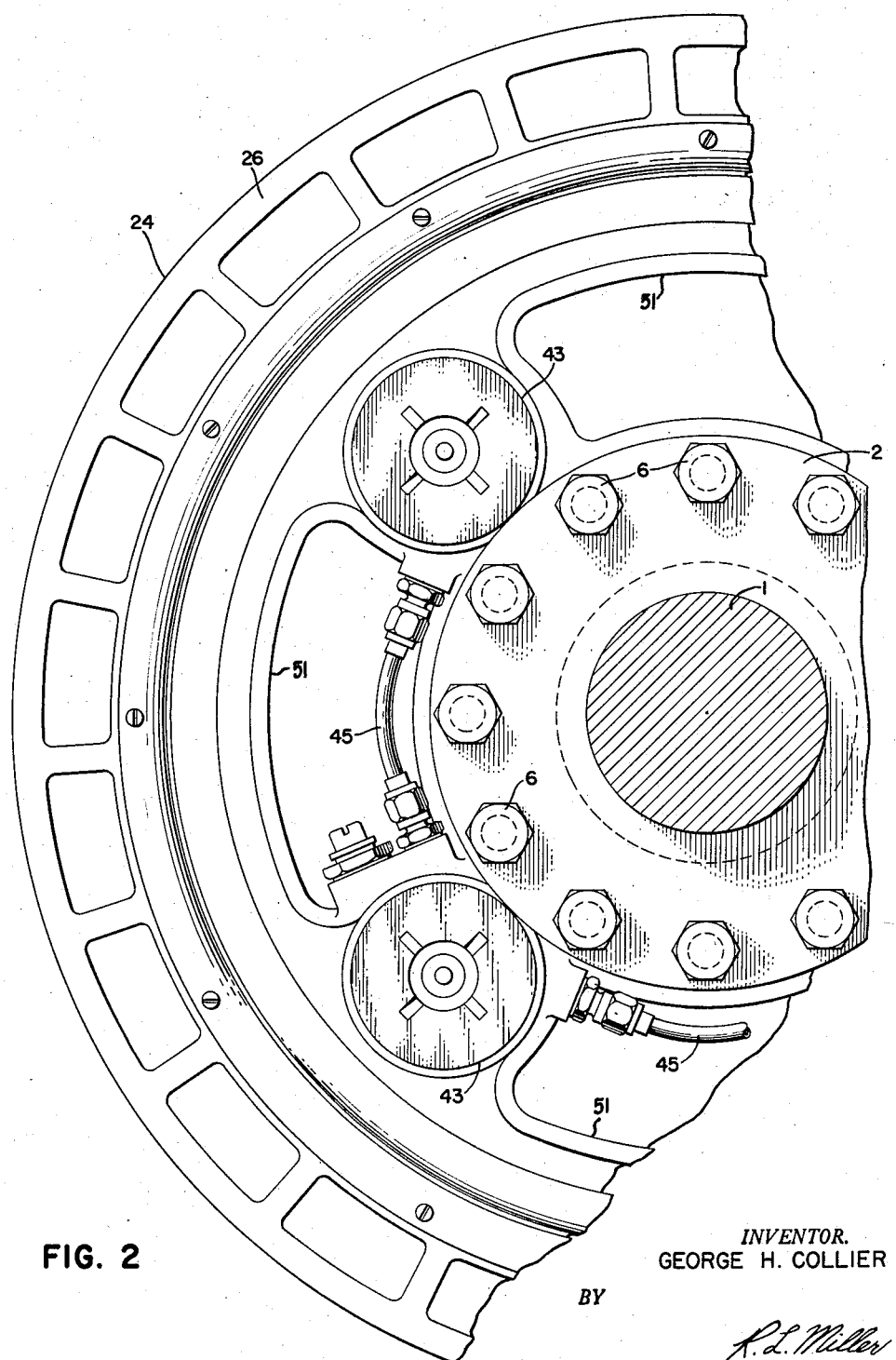

Of the drawings,

Fig. 1 is an axial sectional view of a wheel and brake assembly constructed in accordance with and embodying the invention and, Fig. 2 is an elevation of one half of the wheel and brake, the other portion being broken away.

Referring to the drawings, the numeral 1 designates a landing wheel axle of an airplane having a radial flange 2 integral therewith. The axle, which is non-rotative, has a surface for seating a sleeve 3, the sleeve having a suitable bore. A brake supporting disc 4 is mounted on the sleeve 3 against a radial flange 5 thereof, the brake supporting disc being retained by a plurality of tap bolts 6 arranged about the flange in spaced relation and extending through flanges 2 and 5 and engaging threaded openings in the disc.

A backing disc 7 is seated on the sleeve 3 at the outboard end thereof against a shoulder 8 of the sleeve, the backing disc being keyed to the sleeve against rotation and being held against the shoulder 8 by a nut 9 engaging and locked on a thread 10 of the sleeve, a washer 11 being retained between the nut and the backing disc and the assembly being sealed by a sealing ring 12. The entire brake structure is of generally cylindrical form and occupies a minimum of space.

The brake supporting disc 4, which carries the brake mechanism, as hereinafter described, supports about its outer periphery a large roller bearing 13, comprising a conical inner race 14, a conical outer race 15 and a roller cage 16 supporting a multiplicity of rollers 17. The inner race 14 is seated against a radial shoulder 18 of the brake supporting disc 4 against axial movement in an inboard direction.

A small roller bearing 19 is seated on the outboard end of sleeve 3 for supporting the outboard side of the wheel, and confines a conical inner race 20, a conical outer race 21 and a roller cage 22 therebetween supporting a multiplicity of rollers 23.

The wheel 24 which is of light, strong material, such as of cast magnesium, is of open-ended drum-like construction and comprises a cylindrical substantially unbroken tire seat 25 extending from an inboard bead-seating flange 26 over the bearing 13 and beyond the backing disc to a reduced shoulder 27 at the outboard side of the wheel. The shoulder portion 27 provides for receiving a removable rim flange 28, and merges into a disc portion 29 extending inwardly and supported on the bearing 19. The disc portion 29 is reinforced by radial ribs 30 which spring inwardly of the wheel from the disc portion 29 and join the cylindrical tire seat, just clearing the backing disc 7.

The brake is entirely surrounded by the wheel and is of the disc type. To this end, the wheel 24 has a series of axially extending coupling means such as keys or serrations 31 on its inner face for engaging and supporting a plurality of friction disc rings 32. The discs 32 are generally of metal and have serrations about their outer peripheries for engaging the serrations of the wheel for driving the discs therefrom while permitting axial movement of the discs. The sleeve 3 is provided with axial keyways or serrations 33 on its outer face, and slidably but non-rotatably supported thereon are metal spiders 34 and 35 which carry, with the help of backing disc 7, blocks 36 and 37 of friction material.

For retaining the wheel, it is formed with a shoulder 38 at its inboard side for engaging the raceway 15 and a shoulder 39 at its outboard side to engage the raceway 21. A washer 40 bears against the raceway 20 and is retained by a nut 41 threaded upon a reduced threaded end 42 of the axle, the nut being retained against rotation by a lock ring or cotter pin.

For operating the brakes, a plurality of brake-operating cylinders 43 are formed in the brake supporting disc 4. Each cylinder has a piston 44 fitted therein and bearing against the ring 34. The cylinders are connected in parallel by pipes 45 to each other and to a source of hydraulic pressure. When pressure is applied to the cylinders the rings 32 are clamped by the rings 34, 35, 36, and 37.

For retaining the flange 28 on the wheel a split lock ring 46 is provided for seating in a groove 47 of the wheel. For cooling the brake, the disc portion 29 of the wheel is provided with apertures 48 therethrough of relatively large size, made possible by the small size of the roller bearing at that side of the wheel. Also the serrations 31 of the wheel are spaced inwardly of the wall at the tire seat 25 providing a clearance space 49 between the rings of friction material and the wheel for flow of cooling air about the rings. This also provides space for passage of a valve stem 50 from an opening in the tire seat of the wheel to a position where it may be reached for inflation of the tire through one of the apertures 48.

It will also be seen (Fig. 2) that apertures 51 are provided in disc 4 between cylinders 43 so that cooling air flow is provided in either direction through the brake between the wheel and the brake unit via apertures 51, spaces 49, and apertures 48.

The inboard bearing 13 is made of such diameter as to permit passing its outer ring 15 over the outer diameter of the brake, so that by removing the nut 41 and washer 40, the entire wheel with bearing ring 15 and bearing 19 may be removed over the brake without disturbing the brake while at the same time permitting inspection of the brake and permitting the wheel to be, except for the removable flange 28, of substantially one piece construction.

The provision of the large bearing at one side of the wheel with a small bearing at the other side also permits the brake to be housed entirely within the wheel, conserving space, and reducing wind resistance. At the same time, the wheel is supported more effectively against axial thrust due to the substantially conical support of its bearings.

Thus it will be seen that the objects of the invention have been accomplished.

While a certain representative embodiment and details have been shown for the purpose of illustrating the invention, it will be apparent to those skilled in this art that various changes and modifications may be made therein without departing from the spirit and scope of the invention.

I claim:

An airplane wheel and brake structure comprising a non-rotatable axle, a brake mounted on said axle and comprising sets of interpolated friction discs, one set of which is non-rotatably carried in axially-movable manner by said axle and the other set of which has outwardly projecting means for engaging a wheel, said brake having a supporting disc at one end thereof, and an open-ended step-bored drum-type wheel adapted to be mounted about said brake by being moved axially thereover, said wheel having a bearing at its larger open end of such large diameter as to be passed over said brake and to be seated on said supporting disc, a disc integral with the opposite end of said wheel, a bearing of smaller size carried by the disc for engaging a smaller portion of said brake adjacent said axle, and radially inwardly directed coupling means on the wheel between said bearings for engaging over said outwardly projecting means of said brake structure in non-rotatable but axially slidable engagement therewith, said supporting disc and said wheel disc being formed over their entire circumferences with circumferentially-spaced large ventilating openings and clearance spaces being provided between the brake and wheel as separated by the radially inwardly directed coupling means to effect through ventilation of the wheel and brake structure in either direction.

References Cited in the file of this patent

UNITED STATES PATENTS

| 1,983,751 | Goodyear et al. | Dec. 11, 1934 |
| 2,671,532 | Du Bois | Mar. 9, 1954 |
| 2,672,220 | Collier | Mar. 16, 1954 |

FOREIGN PATENTS

| 482,791 | Great Britain | Apr. 5, 1938 |